Jan. 10, 1933.    W. H. PRATT    1,894,119
CURRENT LIMITER
Filed Oct. 30, 1931
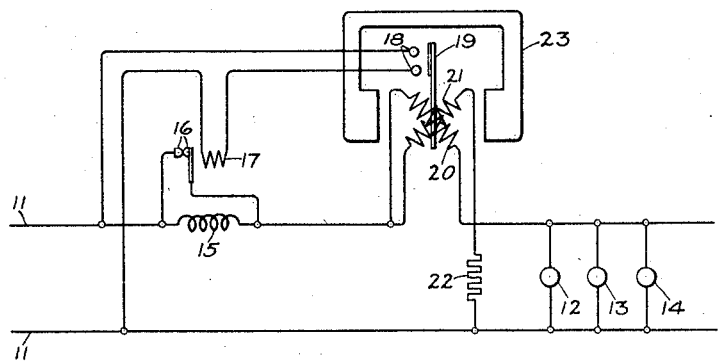
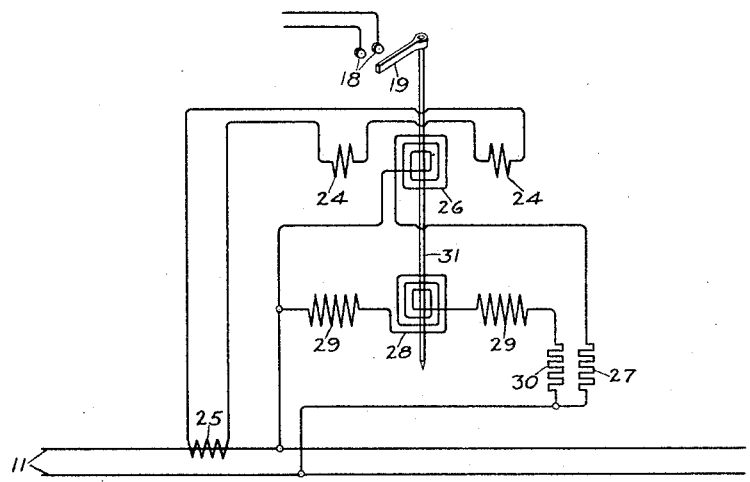
Inventor:
William H. Pratt,
by Charles E. Tullar
His Attorney.

Patented Jan. 10, 1933

1,894,119

UNITED STATES PATENT OFFICE

WILLIAM H. PRATT, OF LYNN, MASSACHUSETTS, ASSIGNOR TO GENERAL ELECTRIC COMPANY, A CORPORATION OF NEW YORK

CURRENT LIMITER

Application filed October 30, 1931. Serial No. 572,207.

My invention relates to electrical instruments and circuit arrangements, and particularly to means for preventing the use of electrical current beyond a predetermined value.

Current limiting devices have been used which were made to function by the flow of current and open the circuit momentarily or reduce the current to a low value whenever a certain current value was exceeded. Upon the operation of such a device the current flow causing its operation no longer exists so that it is restored to the normal position. Thereupon if the conditions causing a large flow of current still exist the device again operates and the operation is periodically repeated. The resultant current fluctuations or interruptions may be very objectionable in causing radio interference or other disturbances.

It is an object of my invention to provide a current limiting device which will remain in the reduced current position until the condition giving rise to the excessive current has ceased and which will then return to the normal position. Other objects and advantages of my invention will become apparent as the description proceeds.

In accordance with my invention, I provide a device responsive to variations in the connected load or to the effective impedance of the load circuit to connect a series resistor or impedance in the line as long as the condition of the circuit is such that a current exceeding a predetermined amount would tend to flow. In order to obtain a device responsive to the constants of the circuit and not merely to the current flow, I utilize an instrument responsive to both current and voltage, preferably the ratio of one to the other or the ratio of a function of one quantity to the function of the other, or to a function of both quantities. The features of my invention which I believe to be novel and patentable will be pointed out in the claims appended hereto.

To afford a more complete understanding of my invention, reference is made in the following description to the accompanying drawing in which Fig. 1 represents a current limiting arrangement responsive to variations in the ratio of voltage to current and in which Fig. 2 represents a modified circuit responsive device especially adapted to use with alternating current circuits.

Referring to the drawing, electrical circuit 11 supplying a number of loads represented at 12, 13 and 14 has connected in series therewith an impedance or a resistance 15. Impedance 15 is normally short-circuited by a pair of contacts 16 controlled by a coil 17. A control circuit to the coil 17 may be closed by a pair of stationary contacts 18 cooperating with a movable contact 19 carried by the movable element of a suitable ratio instrument, which may be of the d'Arsonval type, having a current coil 20 responsive to the current flowing in circuit 11 and a potential coil 21 in series with a multiplier 22 so as to be responsive to the voltage of the circuit 11, and a magnetic field produced by a permanent magnet 23. The device shown is especially adapted to direct-current circuits, but it will be understood that suitable ratio instruments having fields produced by electromagnets, for example, might also be employed in applying my invention to alternating-current circuits.

It will be seen that the current in the circuit 11 will depend upon the number of loads 12, 13 and 14 which are connected to the circuit. If the number of appliances or current consuming devices connected to the circuit is increased, the current drawn will increase, and since the voltage of the supply remains relatively constant, the ratio of voltage to current will fall, indicating that the effective impedance of the load circuits has fallen. When the ratio has fallen to a predetermined value, the movable contact 19 of the ratio instrument 23 will move to the left, closing the control circuit to coil 17 thereby opening contacts 16 and connecting impedance 15 in series with the load so as to reduce the current flowing in circuit 11. Since the effective resistance or impedance of the combined loads 12, 13, and 14 remains substantially the same at reduced voltage and current, the ratio of voltage and current remains substantially the same and the ratio instrument 23 and contactors 16 will remain in the reduced current position until sufficient current-consuming devices have been disconnected from the circuit 11 to increase the ratio of voltage to current to a predetermined value opening contacts 18 and permitting contacts 16 to close, restoring normal voltage to the load circuit. Although I have shown contacts 16 as normally closed, and contacts 18 as normally open, it will be understood that I am not limited to the exact arrangement.

In applying my device to alternating-current circuits it may in some cases be preferable to utilize a device which would respond to ratio of voltage squared to the product of voltage and current or to the ratio of voltage squared to the product of voltage, current, and phase angle, or to some other suitable function of voltage and current.

In Fig. 2 I have illustrated one arrangement for producing a device responsive to the ratio of voltage squared to the product of voltage, current, and cosine of the phase angle. In this modification a pair of stationary current coils 24 supplied with current proportional to the current in circuit 11 by current transformer 25, cooperates with a movable voltage coil 26 connected in series with multiplier 27 across circuit 11 to produce a torque proportional to the product of voltage, current, and the cosine of the phase angle between voltage and current in a manner which will be understood by those skilled in the art. Another movable coil 28 in series with a pair of stationary coils 29 and a multiplier 30 is connected across the circuit 11 to produce a torque proportional to the square of the voltage of circuit 11 as will readily be understood. The coils 26 and 28 attached to shaft 31 are so connected electrically that opposing torques act on shaft 31. The contact 19 will be moved to the left to close contacts 18 when the ratio of voltage squared to the product of voltage, current, and cosine of the phase angle falls below a predetermined value. Likewise the contact 19 will be moved to the right to open contacts 18 when the ratio is above a predetermined value.

As in the arrangement illustrated in Fig. 1, the ratio to which the device is responsive depends upon the number of appliances connected in the load circuit or to abnormal conditions such as total or partial short circuits tending to reduce the effective impedance of the load below a predetermined value so as to draw excessive current and is not responsive merely to variations in current.

Although I have shown a series regulating impedance indirectly controlled by a ratio instrument, it will be understood that I am not limited to this exact arrangement but that other suitable means controlled by a ratio device might be employed to reduce the voltage of a load circuit or the magnitude of the current permitted to flow therethrough.

While I have described my invention in concrete form and as operating in a specific manner in accordance with the provisions of the patent statutes, it should be understood that I do not limit my invention thereto since various modifications thereof will suggest themselves to those skilled in the art without departing from the spirit of my invention, the scope of which is set forth in the appended claims.

What I claim as new and desire to secure by Letters Patent of the United States is:

1. In combination with a circuit carrying an electric current, means for reducing the magnitude of the current in said circuit and means responsive to the impedance of said circuit for controlling said current reducing means, said controlling means comprising a pair of relatively movable members, one of said members carrying a potential coil and a current coil, said controlling means being arranged to place said current reducing means in operation when the impedance of said circuit falls below a predetermined value and to terminate the operation of said current reducing means when the impedance rises above a predetermined value.

2. In combination with a circuit supplying a load with electric current, means for reducing the magnitude of the current in said circuit, and an impedance responsive means connected between said current reducing means and said load for controlling said current reducing means, said impedance responsive means being arranged to place said current reducing means in operation when the impedance of said circuit falls below a predetermined value and to terminate the operation of said current reducing means when the impedance of said circuit rises above a predetermined value.

3. In combination with a circuit carrying an electric current, means for reducing the magnitude of the current in said circuit, and means responsive to the ratio of the voltage of said circuit to the current flowing therein for placing said current reducing means in operation when the impedance of said circuit falls below a certain value and for terminating the operation of said current responsive means when the impedance of said circuit rises above a predetermined value.

4. In combination with a circuit carrying an alternating-current, means for reducing the magnitude of the current flowing in said circuit, and means responsive to the impedance of the load connected to said circuit, said impedance responsive means being connected between said current reducing means and the load and being arranged to place said current reducing means in operation when the load rises to a value which reduces its impedance to a predetermined value and to stop the operation of said current responsive means when the load falls to a value which raises its impedance to a predetermined value.

5. In combination with a circuit carrying an alternating current, means for reducing the magnitude of the current in said circuit, and means responsive to the ratio of the square of the voltage of said circuit to the product of the voltage, current and cosine of the phase angle of said circuit for controlling said current reducing means.

6. In combination with a circuit carrying an electric current, means for reducing the magnitude of the current in said circuit, and means responsive to a function of both the voltage and the current of said circuit, for controlling said current reducing means, said controlling means being arranged to place said current reducing means in operation when the condition of the circuit is such that the current therein would otherwise exceed a predetermined value and to remove said current reducing means from operation when the condition of the circuit is such that current exceeding a predetermined value will no longer tend to flow.

In witness whereof, I have hereunto set my hand.

WILLIAM H. PRATT.